United States Patent [19]

Hölscher

[11] 4,403,857
[45] Sep. 13, 1983

[54] DISTANCE MEASURING DEVICE AND METHOD

[75] Inventor: Hobbe D. Hölscher, Randburg, South Africa

[73] Assignee: South African Inventions Development Corporation, Pretoria, South Africa

[21] Appl. No.: 199,880

[22] Filed: Oct. 23, 1980

[30] Foreign Application Priority Data

Oct. 23, 1979 [ZA] South Africa ............... 79/5655

[51] Int. Cl.³ .................................... G01C 3/08
[52] U.S. Cl. ..................................... 356/5; 343/12 R
[58] Field of Search ..................... 356/5; 343/12 R

[56] References Cited

U.S. PATENT DOCUMENTS

| 3,428,815 | 2/1969 | Thompson | 356/5 |
| 3,619,058 | 11/1971 | Hewlett et al. | 356/5 |

FOREIGN PATENT DOCUMENTS

| 2346183 | 3/1973 | Fed. Rep. of Germany | 356/5 |
| 2000411 | 1/1979 | United Kingdom | 356/5 |

*Primary Examiner*—S. C. Buczinski
*Attorney, Agent, or Firm*—Ladas & Parry

[57] ABSTRACT

Electromagnetic distance measurement, preferably utilizing optical signals. Signals from a main transmitter are transmitted from a first position to a second position and returned to the first position and simultaneously from the main transmitter along a first fixed length path. Two separate receiving channels are provided to receive the two signals. The phase difference between the two received signals is determined. A further auxiliary transmitter is provided and signals are subsequently transmitted from the auxiliary transmitter along second and third fixed length paths to the first and second receiving channels respectively. The phase difference between the received second and third path signals is determined, and the difference between the two phase differences obtained. This difference is then solely dependent on the distance between the two positions and the lengths of the first, second and third paths. Further, if the third path has a length equal to the sum of the lengths of the first and second paths, then the difference is dependent only on the distance between the first and second positions. The transmitted signals are in modulated form. Also, the received signals are heterodyned with a reference signal. Phase angle perturbations due to the electrical equipment is completely eliminated.

15 Claims, 1 Drawing Figure

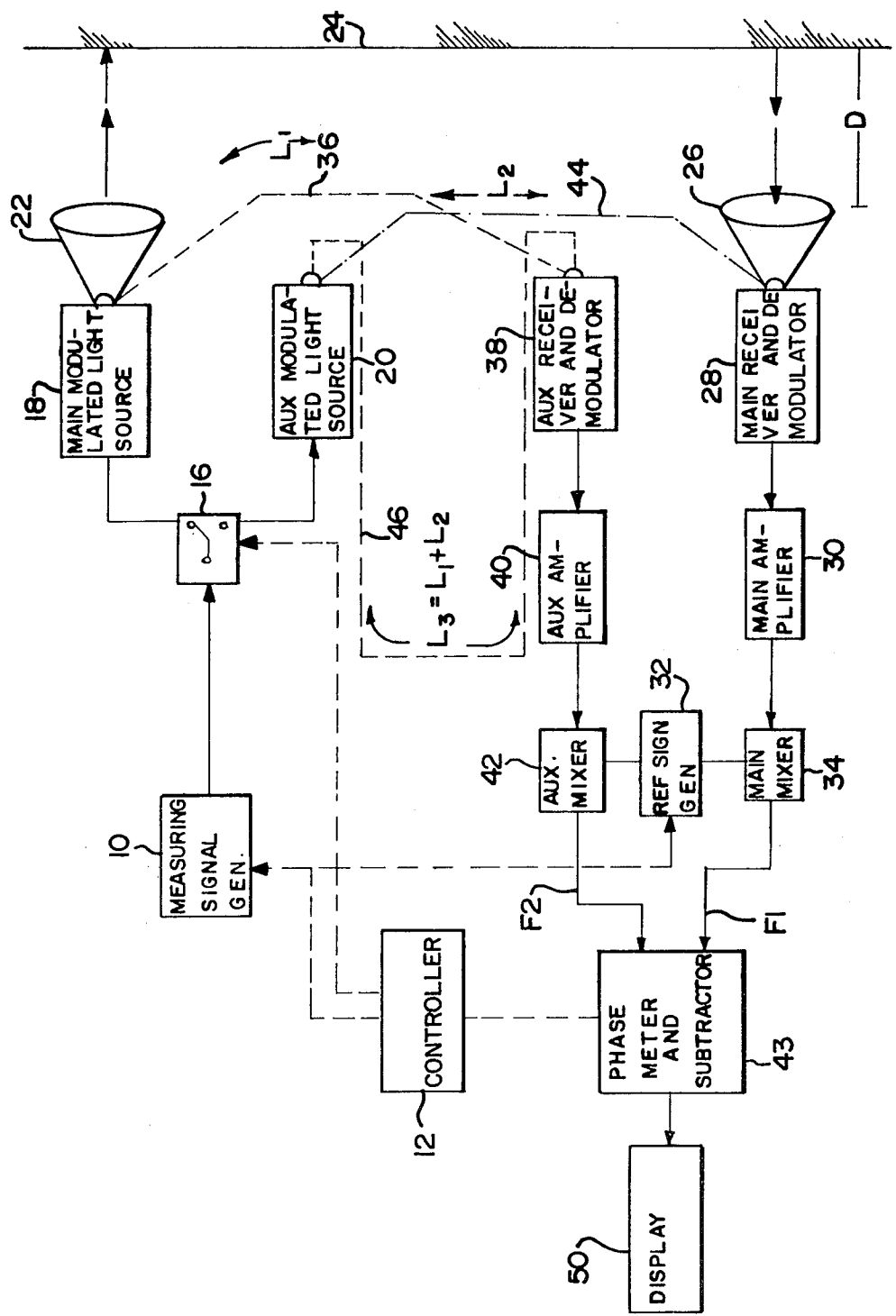

DISTANCE MEASURING DEVICE AND METHOD

This invention relates to distance measurement.

In the measurement of distance with electromagnetic distance measuring (EDM) equipment the change in phase angle of an electromagnetic wave or of a modulation present on the wave, after it has travelled over a given path is a measure of the length of the path. Since high accuracies are possible with EDM equipment it is desirable to eliminate phase angle changes produced by the electronic equipment itself so that the change in phase angle is a measure only of the unknown path length, referred to as the external path, which is being measured. To achieve this in electro-optic EDM systems use is made of a mechanical changeover device which switches a carrier wave from the external path to a fixed internal path to obtain a reference phase measurement at the particular measuring frequency which is comparatively free of circuit induced phase errors. However the rate at which the mechanical device can be switched is limited and if the system is to be effective a reference signal must be provided which is stable for the phase measurements taken successively over the external and the internal paths. In addition the system depends on the phase stability of the transmitted measuring signal and the reference signal over the entire measuring period. Apart from this the mechanical device does not readily lend itself to altering the ratios of the time periods for which the internal and the external paths are measured. For example long measuring periods for long external paths are desirable so as to increase by averaging the resulting signal to noise ratio in the signal which carries the relevant phase change.

It is an object of the present invention to provide distance measuring apparatus in which phase angle errors introduced by the equipment are substantially eliminated.

According to the invention there is provided an apparatus for determining the distance between a first position at which the apparatus is located and a second position, which includes a generating means for generating a measuring signal;

a first and a second transmitting means for transmitting the measuring signal;

a switching means for connecting the generating means between the first and the second transmitting means;

a first detecting means and a second detecting means responsive to signals transmitted by the first and second transmitting means;

a first path defining means defining a first path of fixed length between the first transmitting means and the second detecting means for conveying signals transmitted by the first transmitting means to the second detecting means;

a second path defining means defining a second path of fixed length between the second transmitting means and the first detecting means for conveying signals transmitted by the second transmitting means to the first detecting means;

a third path defining means defining a third path of fixed length between the transmitting means and the second detecting means for conveying signals transmitted by the second transmitting means to the second detecting means;

with the first detecting means also being responsive to signals transmitted by the first transmitting means to the second position and returned to the first position; and a first phase difference determining means for determining the difference in phase angle between the output signals of the first and second detecting means.

The apparatus may include a second phase difference determining means for determining the difference in phase angle between the phase angle determined by the first phase difference determining means when the first transmitting means is connected to the generating means and that determined by the first phase difference detecting means when the second transmitting means is connected to the generating means.

Further according to the invention there is provided a method of determining the distance between a first position and a second position which includes the steps of transmitting a measuring signal from the first position to the second position and returning it to the first position;

transmitting the measuring signal from the first position along a first path of fixed length;

receiving at the first position the measuring signal returned to the first position from the second position;

receiving the measuring signal at the end of the first path;

determining a first phase difference which is the phase difference between the received returned signal and the received first path signal;

transmitting the measuring signal from the first position along a second path of fixed length;

transmitting the measuring signal from the first position along a third path of fixed length;

receiving the measuring signal transmitted along the second path at the end thereof;

receiving the measuring signal transmitted along the third path at the end thereof;

determining a second phase difference which is the phase difference between the received second path signal and the received third path signal; and determining the difference between the first phase difference and the second phase difference.

It will also be understood, as appears from the apparatus statement of invention, that the measuring signal may be transmitted simultaneously from the first position to the second position and back to the first position and along the first path. Similarly the measuring signal may be transmitted simultaneously along the second and third paths.

In a preferred form, the length of the third path may equal the sum of the lengths of the first and second paths. Thus, the third path defining means may define a third path having a length equal to the sum of the lengths of the first and second paths.

In most instances, the measuring signal itself will not be transmitted. Instead, a carrier signal will be transmitted, the measuring signal being modulated thereon. Any suitable form of modulation may be utilised, such as AM, FM, pulse modulation, or the like. Thus, the first and second transmitting means may include carrier signal generating means for generating a carrier signal and a modulating means for modulating the or each carrier signal with the measuring signal and the first and the second detecting means may include a demodulating means for demodulating their received signals to provide the measuring signals received at the detecting means.

Those skilled in the art will appreciate that, preferably, the transmitted signals are electromagnetic waves. In a preferred form, the apparatus may be optically operable, in which case the signals transmitted by the first and the second transmitting means may have a wavelength of between 1 millimeter and 1 nanometer. It is to be noted that the transmitting means need not utilise carrier waves of the same frequency. All that is necessary is that the detecting means be appropriately responsive and sensitive to the frequencies utilised.

If the apparatus is optically operable, the apparatus may include a reflecting means such as a corner reflector, for reflecting signals from the second position back to the first position. Similarly, the path defining means may be optical fibres, appropriate optical elements, or the like. Depending on the frequency of signals utilised, the path defining means may be cables, waveguides, or the like.

It will also be appreciated that the transmitting means, the detecting means, the modulating means and the demodulating means will depend on the frequencies of the signals. With an optical system, the transmitting means may be any suitable light source that can be modulated. Thus the light emitted may be externally modulated or emitted in modulated form. Similarly, the detecting means may include a light sensitive device which generates an electrical signal in response to light incident thereon. Such devices are also inherently demodulators, and will accordingly also comprise the demodulating means.

As an improvement, the received signals may be mixed with a reference signal, to produce comparison signals of suitably low frequency. Thus, the apparatus may include a reference signal generating means for generating a reference signal; the first detecting means may include a first mixing means for mixing the signal received at the first detecting means with the reference signal, for providing a first comparison signal and for supplying the first comparison signal to the first phase difference detecting means; and the second detecting means may also include a second mixing means for mixing the signal received at the second detecting means with the reference signal, for providing a second comparison signal and for supplying the second comparison signal to the first phase difference determining means. By 'mixing' of two input signals is meant the generation of signals at frequencies that are the sum and difference of the frequencies of the two input signals, with appropriate desired signals being filtered out. In the art 'heterodyning' is used as a synonym for 'mixing.'

The invention is now described, by way of an example, with reference to the accompanying drawing which shows in block diagram form an electromagnetic distance measuring apparatus according to the invention.

In the apparatus a desired sequence of measuring signals at desired frequencies is generated by means of a measuring signal oscillator 10 which is controlled by a control unit 12. The output of the oscillator 10 is supplied to an electronic switch 16, to modulate either a main light source 18 or a secondary source 20. Operation of the switch is controlled by the control unit 12. When the source 18 is driven, its output is collimated by an optical system 22 and transmitted towards a remote corner reflector 24 which returns the incident signal to a receiver optical system 26. The apparatus is located at a first position and the reflector 24 at a second position. The light sources 18 and 20 supply light beams of suitable frequencies which are modulated by the measuring signal.

Radiation collected by the system 26 is focussed onto a main receiver diode 28 where it is then demodulated. The output signal of the diode 28 is the demodulated received measuring signal which has a phase angle determined by the distance D between the apparatus of the invention and the reflector 24. This signal is amplified in an amplifier 30 and then heterodyned with a signal produced by a reference local oscillator 32 in a mixer 34 to obtain a comparison signal $F_1$. At the same time a portion of the signal output by the main source 18 is led over a first, fixed length internal path 36 to a secondary receiver diode 38 where it is demodulated, thereafter passed through an amplifier 40 and a mixer 42. The path 36 is defined by an optical fibre. In the mixer 42 the signal is heterodyned with the output of the reference local oscillator 32 to produce a second comparison frequency signal $F_2$.

On the other hand when the secondary source 20 is driven signals are transmitted over second and third fixed length internal paths 44 and 46 respectively to the receiver diodes 28 and 38. These paths 44 and 46 are also defined by optical fibres.

Use is made of a phase meter 43 to determine the phase difference between the two comparison frequency signals $F_1$ and $F_2$. When the main source 18 is transmitting this phase difference includes a measure of the distance D between the apparatus and the reflector but this phase difference is contaminated by phase angle changes caused by the two receiving channels consisting of the diode 28, the amplifier 30 and the mixer 34 on the one hand and on the other hand the diode 38, the amplifier 40 and the mixer 42. When the secondary source 20 transmits, the same demodulation, amplifying and mixing processes take place and the two comparison frequency signals which are produced differ in phase by an angle which is a function of the phase shifts introduced by the two receiving channels. Those signals which travel over any of the fixed length paths 36, 44 or 46 do have phase shifts caused by the paths, but since the paths are of fixed length these phase shifts are constant and may be regarded as being part of an instrument characteristic. This second phase difference is measured by the phase meter 43 and by programming the phase meter to take the difference between the first and the second sets of phase measurements a measure of the distance D is obtained that is free of all internal phase errors. If desired the length of the path 46 can be made equal to the sum of the lengths of the paths 36 and 44 so that the phase difference between the first and second sets of phase measurements is a function of the distance D only. This distance is then displayed on a suitable display 50.

After each set of measurements is made at a particular frequency the control generator 12 is used to step the measuring signal oscillator 10 and the reference local oscillator 32 through a given series of frequencies required to obtain an unambiguous measure of the distance D.

The secondary source 20 may in general be a lower power, and hence cheaper, source than the main source 18 since it illuminates the main and secondary diodes 28 and 38 respectively over relatively short paths. Also the receiving channel consisting of the secondary diode 38, the amplifier 40 and the mixer 42 may be a low sensitivity channel since it operates at a constant and relatively high signal level. Since the signals $F_1$ and $F_2$ are produced simultaneously during each set of measurements the problem of providing a phase coherent reference signal which existed with the prior art type of instrument is eliminated.

It should be noted that it is not necessary that the main source 18 and the secondary source 20 emit in the same wavelength region. Thus for example the main source 18 may emit in the visible region and the secondary source 20 in the infra-red region. It is only necessary to ensure that the diodes 28 and 38 are responsive and sensitive to the radiation wavelengths emitted by the sources 18 and 20.

MATHEMATICAL ANALYSIS

In order to show the cancellation of internal instrumental phase errors for the system analytically the following is defined:

1. Arbitary starting phases of the signal sources of the form $e = E \sin(2\pi ft + \phi)$ where $\phi$ is the phase angle at time t=0 in radians.
   (a) Main source (18) modulation: fm; $\phi_a$
   (b) Secondary source (20) modulation: fm; $\phi_Z$
   (c) Local oscillator (32) signal: fo; $\phi_o$
2. Phase shifts resulting from path delays:
2.1 Modulation phase shift over distance to be measured (D): $\phi_D$ $$\phi_D = \frac{2\pi D f_m}{V} \text{ radians}$$

where
   D is the distance in meters
   fm is the modulation frequency in Hz
   V is the velocity of propagation of the carrier (modulated) in m/sec.
2.2 Modulation phase shift due to fixed internal paths:
   first path (36)—$\phi_b$
   third path (46)—$\phi_c$
   second path (44)—$\phi_e$
3. Phase shifts in circuits prior to phase meter.
3.1 Main detector, amplifier and mixer grouped together ((38), (40) and (42)); $\phi_p$
3.2 Secondary detector, amplifier and mixer grouped together ((38), (40) and (42)); $\phi_q$
4. Comparison signal phase difference:,
4.1 First phase difference of comparison signals $F_1$ and $F_2$; $\Phi_1$ (main source on)
4.2 Second phase difference of comparison signals $F_1$ and $F_2$; $\Phi_2$ (secondary source on)
4.3 Final phase reading:

$$\Phi = \Phi_1 - \Phi_2$$

Referring to FIG. 1 and from the above definitions it is clear that, with the main source (18) transmitting, the modulation frequency signals applied to the mixers can be expressed as:

at mixer (34): $e_1 = E_1 \sin(2\pi f_m t + \phi_a + \phi_D + \phi_p)$ at mixer (42): $e_2 = E_2 \sin(2\pi f_m t + \phi_a + \phi_b + \phi_q)$ The mixers produce difference frequency comparison signals $F_1$ and $F_2$ that are expressed as $$eF_1 = E'_1 \sin[2\pi(f_m - f_o)t + \phi_a + \phi_D + \phi_p - \phi_o]$$

and $$eF_2 = E'_2 \sin[2\pi(f_m - f_o)t + \phi_a + \phi_b + \phi_q - \phi_o]$$

respectively.

The first phase comparison between $F_1$ and $F_2$ signals therefore yields a phase difference reading, which is stored, equal to $$\Phi_1 = (\phi_a + \phi_D + \phi_p - \phi_o) - (\phi_a + \phi_b + \phi_q - \phi_o)$$
$$= \phi_D + \phi_p - \phi_b - \phi_q$$

With the secondary source (20) transmitting the modulation frequency signals applied to the mixers are expressed as follows:

at mixer (34): $e'_1 = E_1 \sin(2\pi f_m t + \phi_Z + \phi_e + \phi_p)$ at mixer (42): $e'_2 = E_2 \sin(2\pi f_m t + \phi_Z + \phi_c + \phi_q)$ The mixers produce difference frequency comparison signals $F_1$ and $F_2$ expressed as $$eF'_1 = E'_1 \sin[2\pi(f_m - f_o)t + \phi_Z + \phi_e + \phi_p - \phi_o]$$

and $$eF'_2 = E'_2 \sin[2\pi(f_m - f_o)t + \phi_Z + \phi_c + \phi_q - \phi_o]$$

respectively.

The second phase comparison between $F_1$ and $F_2$ yields a phase difference reading equal to $$\Phi_2 = (\phi_Z + \phi_e + \phi_p - \phi_o) - (\phi_Z + \phi_c + \phi_q - \phi_o)$$
$$= \phi_e + \phi_p - \phi_c - \phi_q$$

In (43), $\Phi_2$ is subtracted from the stored reading of $\Phi_1$ to give a final phase reading of $\Phi$, where $$\Phi = \Phi_1 - \Phi_2$$
$$= (\phi_D + \phi_p - \phi_b - \phi_q) - (\phi_e + \phi_p - \phi_c \phi_q)$$
$$\Phi = \phi_D - \phi_b + \phi_c - \phi_e$$

From the above it is seen that the unknown and variable electrical phase shifts due to the circuits, $\phi_p$ and $\phi_q$, are eliminated in the final phase reading. Since $\phi_b$, $\phi_c$ and $\phi_e$ relate to fixed internal paths in the system, the term $(-\phi_b + \phi_c - \phi_e)$ is a constant which can be calibrated out and hence $\Phi$ is a measure of the distance related phase shift $\phi_D$ giving $$\Phi = \phi_D \pm \text{constant.}$$
$$= \frac{2\pi f_m D}{V} \pm \text{constant}$$

Hence $D = \frac{(\Phi \mp \text{constant}) V}{2\pi f_m}$ m

If the sum of the delays due to the internal paths (36) and (44) is made equal to the delay in path (46), then $$\phi_c - (\phi_b + \phi_e) = 0$$

and the calibration constant in the above expression is then zero. We then have $$D = \frac{\Phi \cdot V}{2\pi fm} fm.$$

I claim:

1. An apparatus for determining the distance between a first position at which the apparatus is located and a second position, which includes
a generating means for generating a measuring signal;
a first and a second transmitting means for transmitting the measuring signal;
a switching means for connecting the generating means between the first and the second transmitting means;
a first detecting means and a second detecting means responsive to signals transmitted by the first and second transmitting means;
a first path defining means defining a first path of fixed length between the first transmitting means and the second detecting means for conveying signals transmitted by the first transmitting means to the second detecting means;
a second path defining means defining a second path of fixed length between the second transmitting means and the first detecting means for conveying signals transmitted by the second transmitting means to the first detecting means;
a third path defining means defining a third path of fixed length between the second transmitting means and the second detecting means for conveying signals transmitted by the second transmitting means to the second detecting means;
with the first detecting means also being responsive to signals transmitted by the first transmitting means to the second position and returned to the first position; and
a phase difference determining means for determining the difference in phase angle between the output signals of the first and second detecting means, the phase difference determining means being adapted to determine the distance by determining the difference between the phase angle determined when the first transmitting means is connected to the generating means and that determined when the second transmitting means is connected to the generating means.

2. An apparatus as claimed in claim 1, in which the third path defining means defines a third path having a length equal to the sum of the lengths of the first and second paths.

3. An apparatus as claimed in claim 1, in which the first and second transmitting means include carrier signal generating means for generating carrier signals and a modulating means for modulating each carrier signal with the measuring signal; and
the first and the second detecting means include a demodulating means for demodulating their received signals to provide the measuring signals received at the detecting means.

4. An apparatus as claimed in claim 1, in which the signals transmitted by the first and second transmitting means are electromagnetic waves.

5. An apparatus as claimed in claim 4, in which the signals transmitted by the first and second transmitting means have a wavelength of between 1 millimeter and 1 nanometer.

6. An apparatus as claimed in claim 1, which includes a reflecting means for reflecting signals transmitted by the first transmitting means from the second position to the first detecting means.

7. An apparatus as claimed in claim 1, which includes a reference signal generating means for generating a reference signal;
the first detecting means includes a first mixing means for mixing the signal received at the first detecting means with the reference signal, for providing a first comparison signal and for supplying the first comparison signal to the first phase difference determining means; and
the second detecting means includes a second mixing means for mixing the signal received at the second detecting means with the reference signal, for providing a second comparison signal and for supplying the second comparison signal to the first phase difference determining means.

8. A method of determining the distance between a first position and a second position which includes the steps of
transmitting a measuring signal from the first position to the second position and returning it to the first position;
transmitting the measuring signal from the first position along a first path of fixed length;
receiving at the first position the measuring signal returned to the first position from the second position;
receiving the measuring signal at the end of the first path;
determining a first phase difference which is the phase difference between the received returned signal and the received first path signal;
transmitting the measuring signal from the first position along a second path of fixed length;
transmitting the measuring signal from the first position along a third path of fixed length;
receiving the measuring signal transmitted along the second path at the end thereof;
receiving the measuring signal transmitted along the third path at the end thereof;
determining a second phase difference which is the phase difference between the received second path signal and the received third path signal; and
determining the difference between the first phase difference and the second phase difference.

9. A method as claimed in claim 8, in which the measuring signal is transmitted simultaneously from the first position to the second position and along the first path and the measuring signal is transmitted simultaneously along the second and third paths.

10. A method as claimed in claim 8, in which the measuring signal is transmitted along a third path that has a length equal to the sum of the lengths of the first and second paths.

11. A method as claimed in claim 8, in which the measuring signal is transmitted to the second position and along the first, second and third paths as a modulation of a carrier wave and the received modulated signals are demodulated to extract the received measuring signals.

12. A method as claimed in claim 8, in which electromagnetic waves are transmitted.

13. A method as claimed in claim 12, which includes transmitting signals having wavelengths of between 1 millimeter and 1 nanometer.

14. A method as claimed in claim 8, which includes reflecting the signal transmitted to the second position from the second position back to the first position.

15. A method as claimed in claim 8, which includes
generating a reference signal;
mixing the received returned signal, the received first path signal, the received second path signal and the received third path signal each with the reference signal; and
determining the phase differences between the appropriate mixed signals instead of the received signals.

* * * * *